Patented Oct. 9, 1945

2,386,693

UNITED STATES PATENT OFFICE 2,386,693

PREPARATION OF THE ADDITION COMPOUND OF TRIMETHYLAMINE AND SULPHUR TRIOXIDE

Hans Zacharias Lecher, Plainfield, and William Baptist Hardy, Bound Brook, N. J., assignors to American Cyanamid Company, New York, N. Y., a corporation of Maine No Drawing. Application September 9, 1944, Serial No. 553,460

3 Claims. (Cl. 260—583)

This invention relates to an improved process of preparing addition compounds of trialkylamines and sulphur trioxide, and particularly the betaine-like addition product of trimethylamine and sulphur trioxide.

The addition product of trimethylamine and sulphur trioxide has recently achieved industrial importance as a reagent in the production of sulphuric esters of leuco vat dyestuffs. According to the present invention the compound is readily obtainable by reacting dimethylsulphate with tetramethysulphamide. It is surprising that the reaction takes place so easily. It is probable that it proceeds according to the following equation:

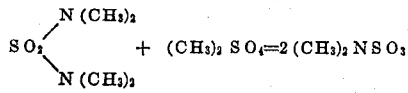

It is an advantage of the present invention that the reaction proceeds smoothly and readily by heating a mixture of the two compounds until an exothermic reaction takes place. The reaction proceeds rapidly, if desired with cooling to prevent undue violence, but gradually slows down and may be completed by short heating at a temperature of about 155° C. This temperature is not at all critical and somewhat lower temperatures may be used. However, higher temperatures are not desirable as decomposition of the reaction mixture begins to take place when 155° C. is materially exceeded.

Best yields are obtained when the dimethylsulphate is present in excess. The exact amount of the excess is not critical.

When operating on a large scale it is sometimes helpful to carry out the reaction in an inert solvent or diluent which prevents local overheating. Any of the ordinary inert diluents or solvents may be used.

The invention will be described in greater detail in conjunction with the following specific examples. The parts are by weight.

Example 1

35 parts of tetramethylsulphamide (prepared in the usual manner by reacting sulphuryl chloride and dimethylamine), is dissolved in 174 parts of dimethylsulphate. The resulting solution is gradually heated to about 125° C., at which temperature an exothermic reaction occurs. The reaction continues, if necessary with slight cooling in large scale operation, and gradually subsides. The temperature is then raised to about 150 to 155° C. until reaction is complete.

The reaction mixture is cooled to 5° C. resulting in the precipitation of a white solid which is filtered off and washed with alcohol. The product is the betaine-like addition compound of sulphur trioxide and trimethylamine and shows good purity, and a good yield is obtained. It is possible to recover some of the excess dimethylsulphate and re-use it.

Example 2

The procedure of Example 1 is followed, but instead of using an excess of dimethylsulphate, substantially equal parts of tetramethylsulphamide and dimethylsulphate are used. The same product is obtained but the yield is somewhat lower.

The addition product of sulphur trioxide and trimethylamine, described in the examples, is the preferred product of the present invention. When such compounds as diethylsulphate and tetraethylsulphamide are used, the result is not a sharply defined solid addition product as in the case of the dimethylsulphate and tetramethylsulphamide.

We claim:

1. A method of preparing the betaine-like addition compound of trimethylamine and sulphur trioxide which comprises reacting tetramethylsulphamide with dimethylsulphate at elevated temperature.

2. A method according to claim 1 in which the dimethylsulphate is present in excess.

3. A process according to claim 1 in which the reactants are heated until exothermic reaction begins, the reaction permitted to continue until it subsides, and the mixture then heated to a higher temperature but not greatly in excess of 155° C.

HANS ZACHARIAS LECHER.
WILLIAM BAPTIST HARDY.

Certificate of Correction

Patent No. 2,386,693.　　　　　　　　　　　　　　　　　　　　October 9, 1945.

HANS ZACHARIAS LECHER, ET AL.

It is hereby certified that error appears in the printed specification requiring correction as follows: Page 1, first column, lines 16 to 19 inclusive, strike out the formula and insert instead the following—

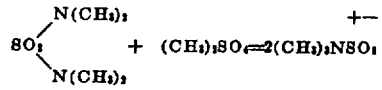

and that the said Letters Patent should be read with this correction therein that the same may conform to the record of the case in the Patent Office.

Signed and sealed this 25th day of December, A. D. 1945.

[SEAL]

LESLIE FRAZER,
　　　　　　　　　　　　　　　　　　　　*First Assistant Commissioner of Patents.*